US010686668B2

(12) United States Patent
Djuric et al.

(10) Patent No.: US 10,686,668 B2
(45) Date of Patent: Jun. 16, 2020

(54) SYSTEMS AND METHODS FOR CONFIGURING A PROBE SERVER NETWORK USING A RELIABILITY MODEL

(71) Applicant: Verisign, Inc., Reston, VA (US)

(72) Inventors: Mirko Djuric, Herndon, VA (US); Velmurugan Periasamy, Herndon, VA (US); Sunil Choppala, Chantilly, VA (US)

(73) Assignee: VERISIGN, INC., Reston, VA (US)

(*) Notice: Subject to any disclaimer, the term of this patent is extended or adjusted under 35 U.S.C. 154(b) by 0 days.

(21) Appl. No.: 15/437,389

(22) Filed: Feb. 20, 2017

(65) Prior Publication Data
US 2017/0230254 A1  Aug. 10, 2017

Related U.S. Application Data

(63) Continuation of application No. 14/050,275, filed on Oct. 9, 2013, now Pat. No. 9,577,910.

(51) Int. Cl.
*H04L 12/26* (2006.01)
*H04L 12/24* (2006.01)

(52) U.S. Cl.
CPC ............ *H04L 41/145* (2013.01); *H04L 41/12* (2013.01); *H04L 41/147* (2013.01);
(Continued)

(58) Field of Classification Search
CPC ..... H04L 41/145; H04L 41/12; H04L 41/147; H04L 41/5012; H04L 43/0817; H04L 43/12
See application file for complete search history.

(56) References Cited

U.S. PATENT DOCUMENTS 6,810,211 B1 * 10/2004 Castanon ............ H04J 14/0227
398/47
6,901,445 B2   5/2005 McCanne et al.
(Continued)

OTHER PUBLICATIONS

Shubham C. Anjankar et al., "Fault Tolerant and Correction System Using Triple Modular Redundancy", International Journal of Emerging Engineering Research and Technology, vol. 2, Issue 2, May 2014, pp. 187-191.
(Continued)

*Primary Examiner* — Uzma Alam
(74) *Attorney, Agent, or Firm* — Artegis Law Group, LLP

(57) ABSTRACT

Implementations relate to systems and methods for configuring a probe server network using a reliability model. A company, customer, or organization may wish to outsource the management of a set of name servers used to operate a domain name, such as a domain name associated with a Web site. In aspects, that deployment of name servers can be monitored by a separate set of failover or probe servers which are configured to track the uptime, operability, and performance of the underlying name servers, which can number in the thousands. An administrator or other user may wish to determine a minimum number of probe servers to apply to the name server topology, to achieve desired service levels. According to aspects, automated tools and logic are provided which model and simulate the overall network including the number and arrangement of necessary probe servers to ensure performance, failover reliability, and other factors.

19 Claims, 9 Drawing Sheets

(52) U.S. Cl.
CPC ...... *H04L 41/5012* (2013.01); *H04L 43/0817* (2013.01); *H04L 43/12* (2013.01); *H04L 43/0805* (2013.01); *H04L 43/0811* (2013.01)

(56) References Cited

U.S. PATENT DOCUMENTS

| | | | |
|---|---|---|---|
| 7,259,666 B1 | 8/2007 | Hermsmeyer et al. | |
| 7,304,959 B1* | 12/2007 | Swaroop | H04L 12/66 370/233 |
| 7,472,314 B2* | 12/2008 | Bejerano | H04L 41/0677 714/47.2 |
| 7,583,604 B2* | 9/2009 | Couturier | H04L 43/062 370/241.1 |
| 7,907,535 B2* | 3/2011 | Agrawal | H04L 41/0677 370/242 |
| 7,912,934 B1* | 3/2011 | Melton | H04L 41/083 370/252 |
| 8,031,628 B2* | 10/2011 | Gu | H04L 41/142 370/252 |
| 8,295,614 B2* | 10/2012 | Ishiyama | G06K 9/00268 382/154 |
| 8,547,834 B1* | 10/2013 | Reeves | H04L 47/127 370/230 |
| 8,547,855 B1* | 10/2013 | Zingale | H04L 41/145 370/241 |
| 8,788,462 B1* | 7/2014 | Roche | G06F 11/1461 707/640 |
| 8,934,352 B2* | 1/2015 | Pei | H04L 41/0677 370/245 |
| 9,282,020 B2* | 3/2016 | Bisdikian | H04L 43/12 |
| 9,622,019 B2* | 4/2017 | Li | H04W 4/70 |
| 2001/0056486 A1* | 12/2001 | Kosaka | H04L 43/00 709/224 |
| 2004/0218548 A1* | 11/2004 | Kennedy | H04L 1/1685 370/254 |
| 2004/0261116 A1 | 12/2004 | Mckeown et al. | |
| 2005/0081116 A1* | 4/2005 | Bejerano | H04L 41/0677 714/47.2 |
| 2006/0190602 A1 | 8/2006 | Canali et al. | |
| 2006/0212568 A1* | 9/2006 | Morris | H04L 12/66 709/224 |
| 2007/0117518 A1 | 8/2007 | Li | |
| 2007/0177518 A1* | 8/2007 | Li | H04L 43/50 370/252 |
| 2008/0304421 A1* | 12/2008 | Ramasubramanian | H04L 41/147 370/251 |
| 2008/0320151 A1 | 12/2008 | McCanne et al. | |
| 2009/0135727 A1* | 5/2009 | Agrawal | H04L 41/0677 370/248 |
| 2010/0202298 A1 | 8/2010 | Agarwal | |
| 2010/0223364 A1 | 9/2010 | Wei | |
| 2010/0228819 A1 | 9/2010 | Wei | |
| 2010/0250739 A1* | 9/2010 | Murata | H04L 41/0896 709/224 |
| 2010/0325306 A1* | 12/2010 | Vimpari | H04L 29/12471 709/233 |
| 2011/0099420 A1 | 4/2011 | MacDonald McAlister et al. | |
| 2011/0106757 A1 | 5/2011 | Pickney et al. | |
| 2011/0145386 A1 | 6/2011 | Stolorz et al. | |
| 2011/0178983 A1 | 7/2011 | Bernard et al. | |
| 2012/0017110 A1* | 1/2012 | Omar | H04L 41/0663 714/2 |
| 2012/0116678 A1* | 5/2012 | Witmer | G01C 21/32 702/5 |
| 2012/0215938 A1 | 8/2012 | Fletcher et al. | |
| 2012/0246126 A1 | 9/2012 | Rodriquez et al. | |
| 2012/0246273 A1 | 9/2012 | Bornstein et al. | |
| 2012/0275311 A1* | 11/2012 | Ivershen | H04L 41/12 370/241 |
| 2013/0097304 A1* | 4/2013 | Asthana | H04L 41/5025 709/224 |
| 2013/0148537 A1* | 6/2013 | Uchida | H04L 43/12 370/252 |
| 2013/0268638 A1* | 10/2013 | Anderson | H04L 41/12 709/220 |
| 2013/0322298 A1* | 12/2013 | Alexander, Jr. | H04L 41/12 370/255 |
| 2014/0325279 A1* | 10/2014 | Suriyanarayanan | H04L 43/12 714/37 |

OTHER PUBLICATIONS

T. Li et al., "Cisco Hot Standby Router Protocol (HSRP)", The Internet Society, Mar. 1998, Retrieved from the Internet: hllps://www.ielf.org/rfc/rfc2281.lxt, pp. 1-17.
Extended European Search Report dated Mar. 6, 2015, European Application No. 14188335.5 filed Oct. 9, 2014, pp. 1-13.
Non-Final Office Action for U.S. Appl. No. 14/050,275, dated Sep. 30, 2015, 9 pages.
Final Office Action for U.S. Appl. No. 14/050,275, dated May 9, 2016, 8 pages.
Notice of Allowance for U.S. Appl. No. 14/050,275, dated Oct. 6, 2016, 7 pages.

* cited by examiner

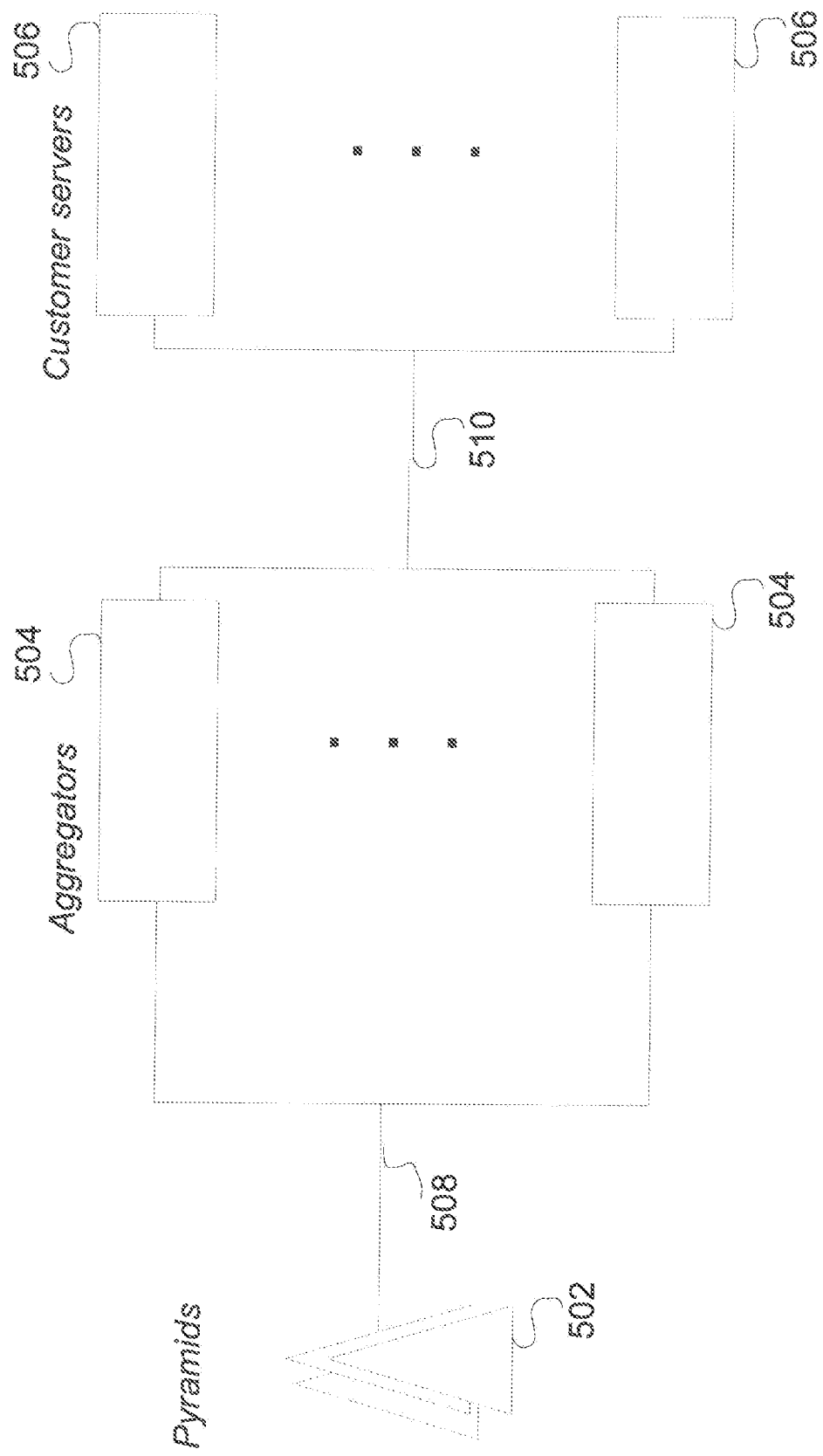

SYSTEMS AND METHODS FOR CONFIGURING A PROBE SERVER NETWORK USING A RELIABILITY MODEL

CROSS-REFERENCE TO RELATED APPLICATIONS

This application is a continuation of the co-pending U.S. patent application titled, "SYSTEMS AND METHODS FOR CONFIGURING A PROBE SERVER NETWORK USING A RELIABILITY MODEL," filed on Oct. 9, 2013 and having Ser. No. 14/050,275. The subject matter of this related application is hereby incorporated herein by reference.

FIELD

The present teachings relate to systems and methods for configuring a probe server network using a reliability model, and more particularly, to platforms and techniques used to design and configure a network of probe servers to monitor a set of underlying name servers, based on an overall network reliability model.

BACKGROUND

In the field of network services, arrangements are known in which a company or other organization outsources the operation or maintenance of a domain name resolution platform. In those types of networks, the operator may engage a third-party provider which maintains or employs a set of domain name resolution servers (or name servers, for short) which operate to resolve requests to navigate to a domain name space. The name servers may be dedicated to supporting the domain name operations of that specific company or other organization, rather than a variety of domains at large. This arrangement can be referred to as managed domain name systems or services, or mDNS. The domain name service can in general receive a subject domain name, such as a domain name of the form "companyname.com," and translate or resolve that name into a numerical Internet Protocol (IP) address or other value.

In known mDNS architectures, the third-party provider of the mDNS service may wish to monitor the performance and reliability of the overall network that includes the set of domain name servers in order to gauge the delivery of mDNS services, schedule maintenance of hardware or software, meter or bill those services, or perform other tasks. To perform those kinds of monitoring operations, the mDNS provider or other entity may deploy a set of "probe" servers which monitor the availability and performance of the name servers and their underlying resolution services. The set of probe servers can be operated from an external vantage point to the name servers, and can capture and record system uptime, downtime, response times, and a variety of other network operations and performance data.

However, no tools are available to assist an administrator or other user in assessing, setting up, and operating the necessary probe servers for these types of monitoring network. To deploy a monitoring network, the administrator or other user may, for instance, have to manually estimate the number of probe servers needed to effectively monitor a given mDNS network, allow for the expected or predicted frequency of network failures and associated downtime (including those of the probe servers themselves), and provide for the ability of the overall mDNS network to scale or reduce as the demands of the underlying customer domain infrastructure change.

In trying to carry out those estimates and implementations, if an administrator or other user creates a smaller than needed estimate of the total number of probe servers, that scenario can create result in name service failures and/or failures in the monitoring operations, themselves. Conversely, when an administrator or other user creates a larger than necessary number of probe servers, that outcome can unnecessarily increase the overall costs of the network, create an excessive flow of messages between the probe servers and name servers, and place excessive burdens on service logging and disk space.

It may be desirable to provide methods and systems for configuring a probe server network using a reliability model, in which a set of analytic tools and automated resources can allow an administrator or other user to configure mDNS networks, including the complement of probe servers, on a managed or rationalized basis.

DESCRIPTION OF DRAWINGS

The accompanying drawings, which are incorporated in and constitute a part of this specification, illustrate implementations of the present teachings and together with the description, serve to explain principles of the present teachings. In the figures:

FIG. 5 illustrates an alternative overall network 500 configuration, according to implementations;

DESCRIPTION OF IMPLEMENTATIONS

Figure 1:
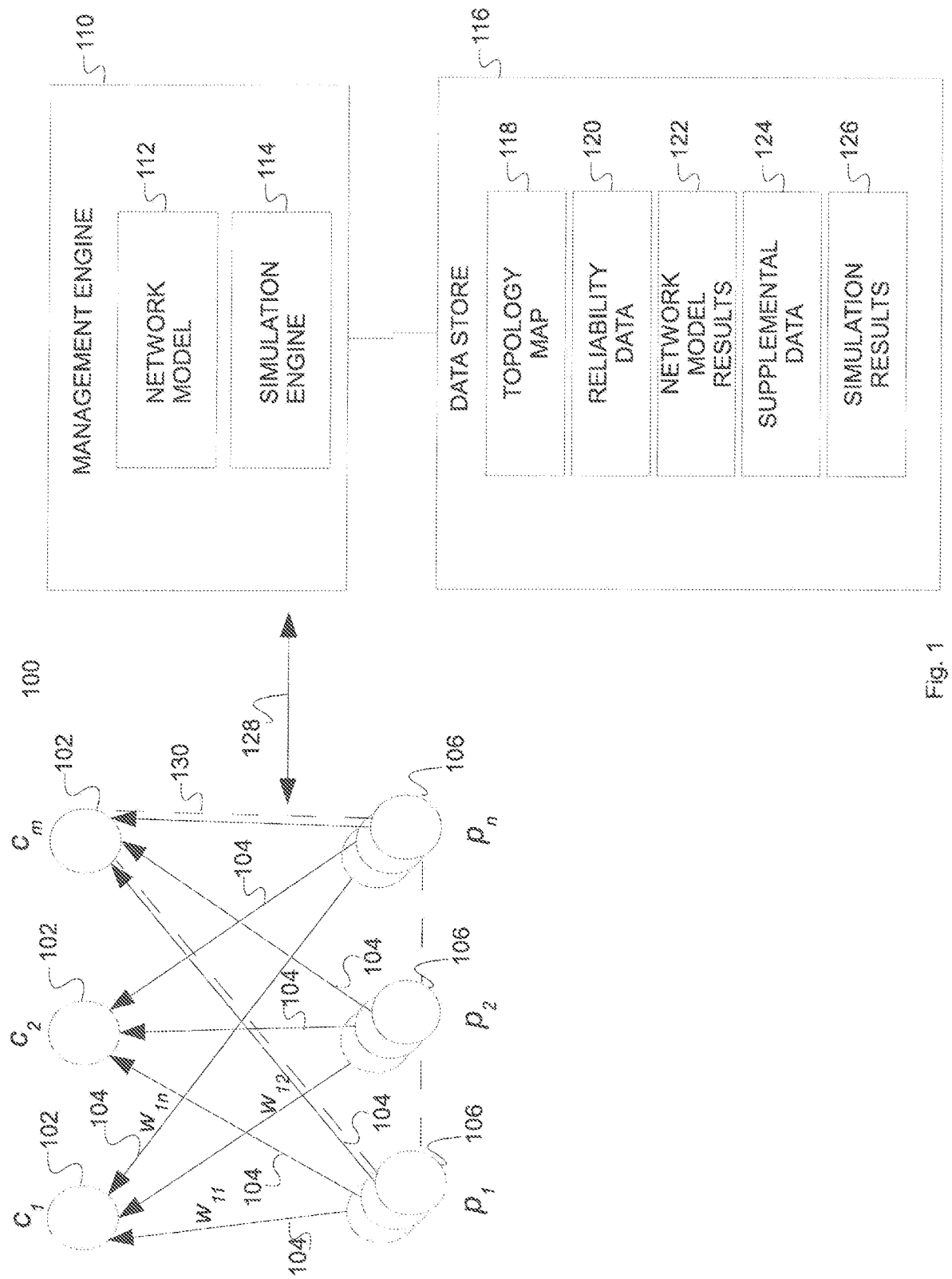
FIG. 1 illustrates an overall network 100 which can be used in systems and methods for configuring a probe server network using a reliability model, according to various implementations.

Implementations of the present teachings relate to systems and methods for configuring a probe server network using a reliability model. More particularly, implementations relate to platforms and techniques for establishing an mDNS network, including underlying name servers, probe servers to monitor the name servers, and connections between all of those server nodes. In preparing the overall network for operation, the inventive platforms and techniques can use defined metrics and requirements for reliability, uptime, scalability and other network performance features, and generate a suggested number of probe servers necessary to achieve those metrics. The deployment of automatic network design and analysis tools can help to eliminate design guesswork and provide operational benefits including reduced cost, better bandwidth utilization, storage, and efficiency gains. In aspects, the inventive platform and techniques can employ a management engine that has at least two component parts: a mathematical network model or engine, and a simulation model or engine.

The mathematical network model or engine (at times, for brevity referred to as the network model) can analyze core information about the overall reliability of the service architecture reliability. The network model can derive reliability metrics in part by answering at least two basic worst case scenario questions for the network, namely:

a) when the service will fail, and at what level; and
b) when, and at what level, a service switchover between servers might happen when it is not necessary.

The network model is based on knowledge of the overall network topology, including name server array size, probe server array size, and the configuration of a set of connections between those nodes or elements. The network model as noted also operates on a set of reliability data that can characterize each element of the overall service architecture, including probe servers, name servers, and again the network connections between those server nodes or clusters. The network model can be configured to compute an amount of time (measured in minutes, hours, or other units, for example) during which the name service or monitoring service will fail, or an unnecessary service switchover is initiated.

In each case the network model can impose a requirement that the name server out of service state must be detected by at least two probe servers, to ensure accuracy in assessing that state. The network model can further accommodate either service architecture growth or network reduction, and can adjust to having an architecture element (network connection or other) permanently out of service.

The monitoring platform can moreover apply a second layer of analysis and management used to configure and administer the overall network 100, using an additional simulation engine or model designed to carry out long-range simulations of the network model. The simulation engine comes into play when an administrator or other user has completed analytical work on the network using the network model, but wishes to perform further or more detailed analysis on one or more aspects of the overall network. The simulation engine can incorporate, or receive as a baseline input, the service architecture as generated or conditioned by the network model, and can further take into account two additional requirements. These requirements can be derived from service level agreements (SLAs) or other requirements of the customer deploying the name servers:

a) once visible, the name server out of service state triggers immediate service switchover, no matter how long the time between failure and repair might be; and
b) any name server failure visible inside some (e.g. SLA) predefined interval will be handled unconditionally.

The simulation engine is computationally efficient, and can aggregate all network connection and probe server simulated failures and merge them with the simulated name server failures. In terms of the simulation techniques employed by the simulation engine, in implementations the simulation engine can be based on a Monte Carlo simulation engine. In implementations, other simulation engines or models can be used. After conducting a Monte Carlo random walk or other simulation operation, the simulation engine can use a branch-and-bound algorithm or other technique in order to determine whether a particular name server failure is visible to at least two probe servers, as stipulated by the network model, itself.

By applying these and other techniques and factors, the monitoring platform and techniques of the present teachings can adjust and scale a set of zero or more probe servers to efficiently service a set of zero or more name servers of a given size and performance characteristics. The monitoring platform and techniques can generate and identify a number of probe servers reflecting a minimum, maximum, highly-tuned, recommended, most practically efficient, and/or optimized number of probe servers, and/or arrangement for those probe servers. The number of probe servers can be arrived at, in part, by factoring in a thorough or complete analysis of failure modes in the overall network, including analysis to identify and quantify faults or failures in the name servers, in the probe servers themselves, and connections between those elements. The failure analysis can account for a variety of failure modes, including concurrent, sequential, and/or otherwise overlapping failures of the name servers, probe servers, and connections.

By incorporating these factors and others, the monitoring platform can reduce the occurrence of false positive detections, false negative detections, double fault detections, and other spurious or inaccurately detected failure events. Unnecessary transitions to other name or probe servers (failover events) can consequently be reduced or eliminated. It may be noted that in aspects, the occurrence of false detection of name server failures (false positives) can represent one factor that imposes burdens or inefficiencies on the overall monitoring network, since false positives can create the impression that the name service is failing at a greater rate than it actually is.

In that situation, an administrator or other user may deploy more name servers or other resources than necessary, to try to create an adequate reserve for failover purposes. By committing more name servers than necessary, the corresponding number of probe servers may also be needlessly increased, and the amount of monitoring traffic, storage, maintenance, and other costs may be increased. Systems and methods according to the present teachings can help to reduce or eliminate those effects, by explicitly taking into account the possibility of false positives and other spurious or unreliable detected events.

Reference will now be made in detail to exemplary implementations of the present teachings, which are illustrated in the accompanying drawings. Where possible the same reference numbers will be used throughout the drawings to refer to the same or like parts.

FIG. 1 illustrates an overall network 100 in which systems and methods for configuring a probe server network using a reliability model can operate, according to aspects. In aspects as shown, the overall network 100 as an environment can comprise a set of name servers 102 (labeled as "c" with subscript), a set of probe servers 106 (labeled as "p" with subscript), and a set of connections 104 (labeled as "w" with subscript).

Within the overall network 100, a management engine 110 can operate to monitor and maintain the set of name servers 102, the set of probe servers 106, and/or the set of connections 104. The management engine 110 can communicate with those elements and others via one or more connections 128. In implementations, the management engine 110 can comprise one or more servers, which can be co-located with the set of probe servers 106 and/or name servers 102, and/or can be situated remotely from those nodes or elements. In implementations, the management engine 110 can be partly or wholly implemented as a network-based service, such as a service or application operating in a cloud-based network or other network.

The management engine 110 can host or comprise modules, services, software, and/or logic including a network model 112 and a simulation engine 114 to analyze, characterize, configure, maintain, and operate the set of name servers 102 and other elements of the overall network 100. The management engine 110 can also communicate with a local or remote data store 116 to access and maintain data related to the overall network 100. The management engine 110 can be or include a server with one or more connections 128 to the set of name servers 102, set of connections 104, and set of probe servers 106. The one or more connections 128 can be or include, for instance, the Internet and/or other public or private networks or connections.

The topology of the overall network 100 can be viewed to include one or more pyramids, meaning the connections between at least two probes in the set of probe servers 106 and a single name server in the set of name servers 102, with the name server at the apex of each pyramid 130, as represented by the dashed line in FIG. 1. The topology of the overall network 100 including those pyramid elements can be reflected or encoded in a topology map 118. The topology map 118 can be or include a linked list, graph, and/or other representation of the arrangement of the overall network 100, including the location of the set of name servers 102, the location of the set of probe servers 106, and the location and/or types of the connections and relationships between those servers, each pyramid 130 or other sub-structure, and/or other elements or nodes. In implementations, the topology map 118 can be entered by an administrator or other user, can automatically be discovered by the monitoring platform itself, and/or can be accessed or retrieved in other ways or from other sources. The topology map 118 can be stored in data store 116 and/or other local or remote data store.

In implementations, the monitoring platform may assume that every probe in the set of probe servers 106 can test the "sanity" or operational soundness of any of the name servers in the set of name servers 102. It platform may likewise assume, as an operating condition, that if at least two of the probes in the set of probe servers 106 determine that a particular name server is not in service, then it is established to be not in service. An entire pyramid 130 is considered out of service if no more than one probe connected to the subject name server at the apex of the pyramid 130 is in service, and that name server is also out of service. It may be noted that in implementations, the condition that every probe tests the sanity of all of the name servers in the set of name servers 102 can be replaced by a name server "heartbeat" mechanism, which can decrease the overall network 100 traffic, with little or no effect on the overall topology reliability. In implementations of those types, the set of probe servers 106 and/or the set of name servers 102 can produce or exchange periodic signals of predetermined frequency, whose order can be assembled using timestamp information to determine that each participating node is alive in a given interval. Other techniques can be used.

Regardless of the type of communication mechanism used by the set of probe servers 106 to perform monitoring activity, it will be appreciated that the inventive platforms and techniques can readily accommodate, and scale or reduce to, networks of name servers of a great variety of sizes. In implementations, for instance, the set of name servers 102 can comprise a relatively large number of servers, on the order of a thousand or multiple thousands, or more. Part of the benefit of platforms and techniques according to the present teachings is that the necessary set of probe servers 106, the set of connections 104, and other elements or resources deployed for failover monitoring purposes can be reliably estimated, regardless of overall network size or changes in the network.

It may be noted that permanent failure of a name server in the set of name servers 102 does not change the topology or the network, nor does permanent failure of a probe server change that topology. Both of these types of permanent failures instead change only the dimension of the topology. Only a permanent failure of a connection in the set of connections 104 might be seen as a topology change, in the sense that a single probe server might under those conditions be unable to probe all name servers in the set of name servers 102. In implementations, a more complete set of conditions or constraints on the overall network 100 topology shown in FIG. 1 include:

a) Each pyramid has no less than 3 probe servers associated with it.
b) A name server failure is visible if it is visible to at least two probe servers.
c) A name server failure is visible to a single probe server if it is visible to that server for more than 2 minutes.

The network model 112 operating or executing on the management engine 110, as noted, can include an operational model of the overall network 100, including its reliability, scalability, performance, and other characteristics. Those parameters can be encoded or reflected in a set of topology maps 120 that can be generated, accessed, and maintained by the management engine 110, and as shown for instance stored in data store 116. The set of topology maps 120 can include a variety of types of data and/or data produced by various sources, and can, in implementations, include both modeled or predicted data regarding the behavior of the overall network 100, as well as empirical data capturing the real world operation of the overall network 100. In establishing those factors or criteria, the following quantities can be used to characterize the overall network 100.

$p_i$, i=1, 2, . . . , n is the probability p that probe server i will be out of service, $c_j$, j=1, 2, . . . , m is the probability c that name server j will be out of service, and $w_{ij}$, i=1, 2, . . . , n, j=1, 2, . . . , m is the probability w that the probe server i—name server j network connection will fail within some predefined time period or interval.

The component failure is defined by the failure perception moment, and by the time between failure and the failure repair. The assumption is that any single topology component (name server, probe server, network connection) failure is completely independent of failure of any other topology component. If some (i,j) connection is in the state of permanent failure, then $w_{ij}=1$. Further model assumptions can be restated as:

$p=p_1=p_2=\ldots=p_n$ or $p=\max p_i$, i=1, 2, . . . , n
$c=c_1=c_2=\ldots=c_m$ or $p=\max c_j$, j=1, 2, . . . , m $w=w_{11}=w_{12}=\ldots=w_{mn}$ or $w=\max w_{ij}$, $i=1, 2, \ldots, n$, $j=1, 2, \ldots, m$ In order to construct the pyramid 130 reliability model, two cases can be considered. If all probe servers are failing or just one out of n of them is active, a given pyramid 130 is in a state of failure only if, at the same time, the name server is in a state of failure. The probability of this event can be computed this way:

$$c(p^n + n\, p^{n-1}(1-p)) \qquad \text{Equation (1)}$$

One can exclude one probe server from the other or remaining n and review all possible states of these n−1 servers along with the states of their network connections with the subject name server in the pyramid 130. If 2 of them are in service, they might be put out of service if 1 or 2 network connections are out of service; if 3 out of n are in service, these 3 might be put out of service if their 2 or 3 connections are out of service, etc. This produces the following formula about the probability that the rest of n−1 probe servers might be out of service:

$$c\sum_{k=2}^{n}\binom{n}{k}p^{n-k}(1-p)^k(w^k + kw^{k-1}(1-w)) \qquad \text{Equation (2)}$$

Combining (1) and (2) together, various implementations can compute the probability of the single pyramid failure (F) according to the following:

$$Pr\{F\} = c(p^n + np^{n-1}(1-p)) + \sum_{k=2}^{n}\binom{n}{k}p^{n-k}(1-p)^k(w^k + kw^{k-1}(1-w)) \qquad \text{Equation (3)}$$

At the end, this pyramid reliability calculation can be extended to the reliability of all m pyramids depicted or suggested in FIG. 1.

$$Pr\{\text{one or more } Fs\} = 1-(1-Pr\{F\})^m \qquad \text{Equation (4)}$$

In implementations, false positives, i.e. the cases when name server is in service, but the network is down along the lines connecting the probe servers and the name servers, are measured as well. The cases when no more than one probe server is in service cannot generate false positives. Therefore, if 2 out of n probe servers are up and running, all 2 might be blocked by network failure to see that the customer is in service; if 3 are up, all 3 might be blocked by network failure, etc. In short, $Pr\{\text{one or more false positives for a single pyramid}\} =$ Equation (5)

$$Pr\{Fp\} = (1-c)\sum_{k=2}^{n}\binom{n}{k}p^{n-k}(1-p)^k w^k$$

$Pr\{\text{one or more false positives for whole topology}\} =$ $$1 - (1 - Pr\{Fp\})^m$$

In terms of computed throughput of the overall network 100, assume n=3, 4, 5, or 6 probes in the topology shown in FIG. 1 and m=20, 40, 60, . . . , 2000 name servers. Assume any name server is no more than 1 day out of service in a whole year. Any probe is no more than 1 day out of service in a whole year. Therefore, $$Pr\{\overline{C}\}=c=1/365, Pr\{\overline{P}\}=p=1/365, Pr\{\overline{W}\}=w=1/365$$

TABLE 1

|  |  | Number of customers | | | | |
| --- | --- | --- | --- | --- | --- | --- |
|  |  | 20 | 40 | 60 | . . . 1980 | 2000 |
| Number of probes | n = 3 | 4.904e−06 | 9.808e−06 | 1.471e−05 | . . . 4.854e−04 | 4.903e−04 |
|  | n = 4 | 3.576e−08 | 7.153e−08 | 1.073e−07 | . . . 3.505e−06 | 3.541e−06 |
|  | n = 5 | 2.446e−10 | 4.891e−10 | 7.337e−10 | . . . 2.397e−08 | 2.421e−08 |
|  | n = 6 | 1.605e−12 | 3.211e−12 | 4.816e−12 | . . . 1.573e−10 | 1.589e−10 |

In terms of interpreting results of the network model 112 shown in Table 1 above, for n=6 probe servers, the probability of failure of at least one pyramid 130 out of an overall n=2000 is 1.589e-10. If the year has 365*24*60=525600 minutes, then overall for m=2000 pyramids, the time during the whole year in which one might expect one or more pyramids failures shall be 525600*1.589e-10=9.771e-05 minutes; if n=3 and m=2000 then the overall time for 2000 pyramids in which one might expect one or more pyramid failures shall be on average 525600*4.903e-04=257.70 minutes. Other details are shown in Table 2 below.

TABLE 2

|  |  | Number of customers | | | | |
| --- | --- | --- | --- | --- | --- | --- |
|  |  | 20 | 40 | 60 | . . . 1980 | 2000 |
| Number of probes | n = 3 | 2.58 | 5.16 | 7.73 | . . . 255.12 | 257.70 |
|  | n = 4 | 0.019 | 0.026 | 0.056 | . . . 1.84 | 1.86 |
|  | n = 5 | 0.00013 | 0.00026 | 0.00039 | . . . 0.01260 | 0.01272 |
|  | n = 6 | 0.00000084 | 0.00000169 | 0.00000253 | . . . 0.00008268 | 0.00008352 |

Now consider the example where p=1/3650, i.e. allow the probe servers to be out of service no more than 2.4 hours during the whole year. All other probabilities will be the same as in the previous example.

TABLE 3

| | | Number of customers | | | | |
|---|---|---|---|---|---|---|
| | | 20 | 40 | 60 | ... 1980 | 2000 |
| Number of probes | n = 3 | 1.489e−06 | 2.979e−06 | 4.468e−06 | ... 1.474e−04 | 1.489e−04 |
| | n = 4 | 5.981e−09 | 1.196e−08 | 1.794e−08 | ... 5.921e−07 | 5.981e−07 |
| | n = 5 | 2.252e−11 | 4.504e−11 | 6.757e−11 | ... 2.230e−09 | 2.252e−09 |
| | n = 6 | 6.216e−14 | 1.643e−13 | 2.465e−13 | ... 8.133e−12 | 8.216e−12 | p=1/3650, w=1/365, c=1/3650

TABLE 4

| | | Number of customers | | | | |
|---|---|---|---|---|---|---|
| | | 20 | 40 | 60 | ... 1980 | 2000 |
| Number of probes | n = 3 | 1.489e−07 | 2.979e−07 | 4.468e−07 | ... 1.474e−05 | 1.489e−05 |
| | n = 4 | 5.981e−10 | 1.196e−09 | 1.794e−09 | ... 5.921e−08 | 5.981e−08 |
| | n = 5 | 2.252e−12 | 4.503e−12 | 6.775e−12 | ... 2.229e−10 | 2.252e−10 |
| | n = 6 | 8.882e−15 | 1.776e−14 | 2.665e−14 | ... 8.793e−13 | 8.882e−13 |

In terms of treating false positives, based on Equation (5) and the same assumptions as those valid for the topology throughput, one derives the following Table 5 of false positive probabilities for n=2, 3, . . . , 6 probe servers and m=20, 40, . . . , 2000 name servers:

TABLE 5

| | | Number of customers | | | | |
|---|---|---|---|---|---|---|
| | | 20 | 40 | 60 | ... 1980 | 2000 |
| Number of probes | n = 3 | 1.631e−06 | 3.216e−06 | 4.892e−06 | ... 1.614e−04 | 1.630e−04 |
| | n = 4 | 1.228e−08 | 2.455e−08 | 3.683e−08 | ... 1.215e−06 | 1.228e−06 |
| | n = 5 | 7.942e−11 | 1.588e−10 | 2.382e−10 | ... 7.862e−07 | 7.942e−07 |
| | n = 6 | 4.774e−13 | 9.548e−13 | 1.432e−12 | ... 4.726e−11 | 4.774e−11 |

The same table where probabilities are mapped into minutes of expected false positive time when one might have one or more false positive failover switches is represented as shown in Tables 6-8:

TABLE 6

| | | Number of customers | | | | |
|---|---|---|---|---|---|---|
| | | 20 | 40 | 60 | ... 1980 | 2000 |
| Number of probes | n = 3 | 0.86 | 1.69 | 2.57 | ... 84.83 | 85.67 |
| | n = 4 | 0.0065 | 0.0129 | 0.0194 | ... 0.6386 | 0.6454 |
| | n = 5 | 0.000020 | 0.000083 | 0.000125 | ... 0.413227 | 0.417432 |
| | n = 6 | 0.00000025 | 0.00000050 | 0.00000075 | ... 0.00002484 | 0.00002509 | p=1/3650, w=1/365, c=1/365

TABLE 7

| | | Number of customers | | | | |
|---|---|---|---|---|---|---|
| | | 20 | 40 | 60 | ... 1980 | 2000 |
| Number of probes | n = 3 | 5.382e−07 | 1.066e−06 | 1.598e−06 | ... 5.275e−05 | 5.328e−05 |
| | n = 4 | 1.639e−09 | 3.278e−09 | 4.917e−09 | ... 1.623e−07 | 1.639e−07 |
| | n = 5 | 4.952e−12 | 9.903e−12 | 1.485e−11 | ... 4.902e−10 | 4.952e−10 |
| | n = 6 | 1.554-14 | 3.109e−14 | 4.663e−14 | ... 1.539e−12 | 1.554e−12 | p=1/3650, w=1/365, c=1/3650

TABLE 8

| | | Number of customers | | | | |
|---|---|---|---|---|---|---|
| | | 20 | 40 | 60 | ... 1980 | 2000 |
| Number of probes | n = 3 | 5.341e−07 | 1.068e−06 | 1.602e−06 | ... 5.288e−05 | 5.341e−05 |
| | n = 4 | 1.643e−09 | 3.286e−09 | 4.929e−09 | ... 1.267e−07 | 1.643e−07 |
| | n = 5 | 4.963e−12 | 9.925e−12 | 1.489e−11 | ... 4.913e−10 | 4.963e−10 |
| | n = 6 | 1.554e−14 | 3.109e−14 | 4.663e−14 | ... 1.539e−12 | 1.554e−12 |

In implementations, the network model 112 can be constructed using different, relaxed assumptions as noted below.
$w_1 \neq w_2 \neq \ldots \neq w_n$ $$Pr\{k \text{ or } k-1 \text{ out of } k \text{ connections fails}\} = \prod_{\forall v \in N_k^n} w_{ij} + (1 - w_{ij}) \prod_{\forall l \in N_k \setminus \{j\}} w_{il},$$

$i=1, m\ N_k^n$, any combination of k elements of $N = \{1, 2, \ldots, n\}$
Relaxing the assumptions further:
$p_1 \neq p_2 \neq \ldots \neq p_n$, $j=1, 2, \ldots, n$ and $c_1 \neq c_2 \neq \ldots \neq c_m$, $i=1, 2, \ldots, m$ $$Pr\{\text{pyramid } i \text{ failure}\} = Pr\{F_i\} = \quad \text{Equation (4')}$$

$$c_i \left( \prod_{\forall j \in N} p_{ij} + (1 - p_{ij}) \prod_{\forall k \in N \setminus \{j\}} p_{ik} + \sum_{k=2}^{n} \prod_{\forall j \in N_k^n} (1 - p_{ij}) \right.$$

$$\left. \prod_{\forall l \in N \setminus N_k^n} p_{il} \left( \prod_{\forall j \in N_k^n} w_{ij} + (1 - w_{ir}) \prod_{\forall s \in N_k^n \setminus \{r\}} w_{is} \right) \right)$$

$$Pr\{\text{one or more } F_i\} = 1 - \prod_{i=1}^{m}(1 - Pr\{F_i\})$$

Under the same assumptions as above, one has:

$$Pr\{\text{one or more false positives for a single pyramid}\} =$$

$$Pr\{Fp_i\} = (1 - c_i) \sum_{k=2}^{n} \prod_{\forall j \in N_k} (1 - p_j) w_{ij} \prod_{\forall l \in N \setminus N_k} p_l$$

Therefore, $$Pr\{\text{one or more false positives for whole topology}\} = \quad \text{Equation (5')}$$

$$1 - \prod_{i=2}^{n}(1 - Pr\{Fp_i\})$$

The network model 112 does not observe two cases when the same time-customer-network-probe failure is functionally irrelevant from both the probe and the customer (name server) point of view.

Figure 2:
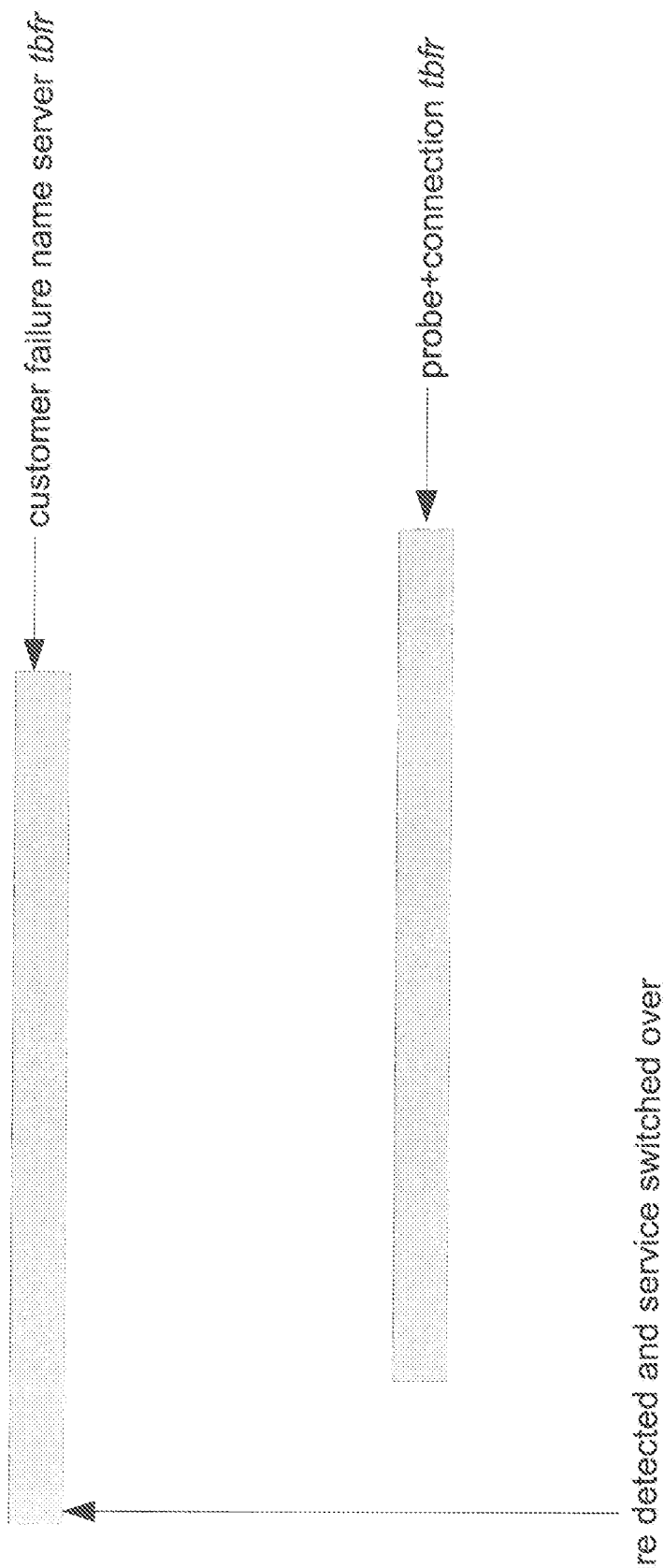
FIG. 2 illustrates a timing diagram of various service failure modes, according to various implementations.

As shown in FIG. 2, the case can exist where a name server fails, and during its between-failure-and-repair (tbfr) time, the network-probe fails too. In that case, there is intersection of the name server tbfr and of the union of probe server and probe server—name server connection tbfr. This intersection cannot be assumed to be a pyramid failure for expecting that the name server failure is already detected, i.e. the failure was visible to the probe server, and the service switchover was executed successfully. If that interval is not large enough to detect the name server failure, then this intersection is the pyramid tbfr.

Figure 3:
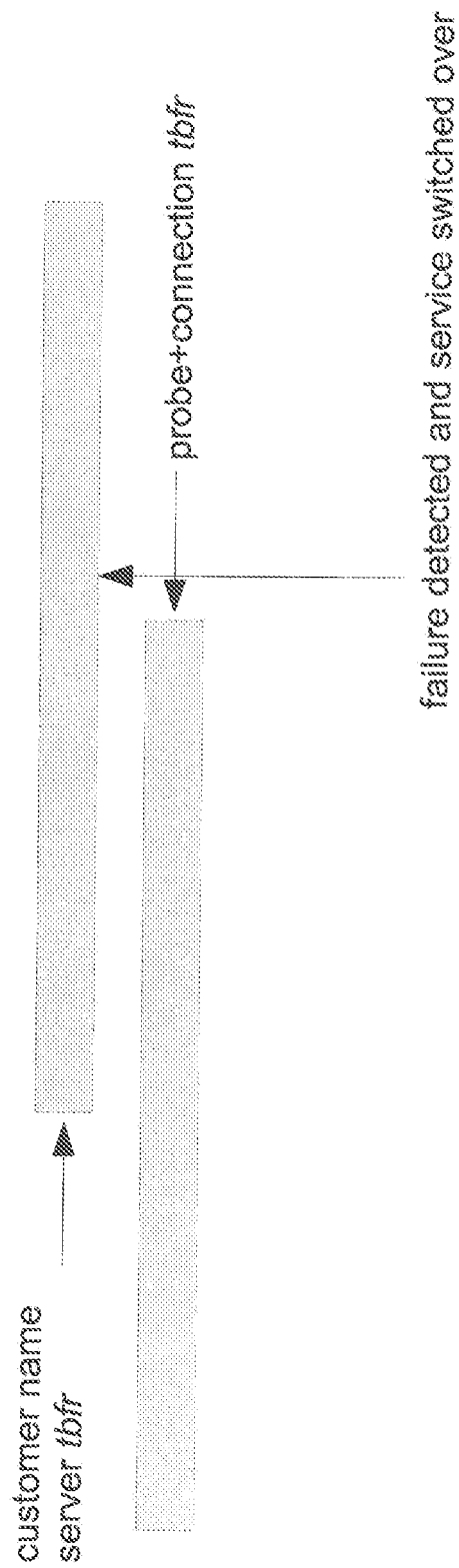
FIG. 3 illustrates a timing diagram of various service failure modes, according to further regards.

One may further consider the case shown in FIG. 3 In this case, the probe server+network is down and the name server goes out of service before the probe+network gets repaired. In this case, if the intersection of the two tbfr is within some SLA time allowed for an effective service switchover, the associated pyramid is not considered to be in the state of failure. The results produced in any of the foregoing operations or calculations of the network model 112 can be stored in a set of network model results 122, for instance, stored in the data store 116 and/or other local or remote data store.

As noted, in addition to the network model 112, the management engine 110 can also employ, in addition to the network model 112, a simulation engine 114. In general terms, the simulation engine 114 can be used to refine the results produced by the network model 112 under additional constraints or operational data. In regards, the network model 112 can be viewed to operate under a worst-case scenario. In implementations, the parameters presumed in a worst-case scenario can be modified or adjusted, for instance based on operating data captured in the overall network 100. That operating data can be captured or recorded in a set of supplemental data 124 accessed by the management engine 110, and for instance stored in the data store 116 and/or other local or remote data store.

In terms of constructing the simulation engine 114 and its associated model or computation, any failure event outcome within a pyramid 130 will be presented by $(f_s, f_l)$ pair where $f_s$ is a network component failure detection time and $f_l$ the component tbfr.

All failures of a pyramid single object (name server, customer-probe connection, probe server) within a single observation period can be presented as a hash table of the $(f_s, f_l)$ pairs, where $f_s$ is a key and $f_l$ a value.

Within a single observation period, for instance one year, one can subdivide all pyramid failure events this way:
 $F_i^{\overline{C}}$—name server i failure; $i=1, 2, \ldots, m$
 $F_{ij}^{\overline{W}}$—name server i—probe server j network connection failure; $i=1, 2, \ldots, m$; $j=1, 2, \ldots, n$
 $F_j^{\overline{P}}$—probe server j failure; $j=1, 2, \ldots, n$
In the introduced annotation above, $\overline{C}, \overline{W},$ and $\overline{P}$, are the markers saying that a name server, connecting network, or probe server is in state of failure. Further, one can define two types of composite events, which will be used during simulation operations by the simulation engine 114.
 Union $S_{ij} = F_{ij}^{\overline{W}} \cup F_j^{\overline{P}}$, $i=1, 2, \ldots, m$; $j=1, 2, \ldots, n$—union of two (i,j) failures of the (probe server i, name server j) connection and probe server j.
 Intersection $= I_{ij} = S_{ij} \cap F_i^{\overline{C}}$, $i=1, 2, \ldots, m$; $j=1, 2, \ldots, n$—intersection of two (i,j) failures (time intervals) inside of which probe server j, $j=1, 2, \ldots, n$ is unable to serve name server i, i=1, 2, . . . , m, if the probe server i is in a failure state or for a failure of the (probe server i, name server j) connection.

To perform simulation activities, for a single simulation period, for instance one year, the following steps can be followed and/or logic applied:

1. Create all $F_j^{\bar{p}}$, j=1, 2, . . . , n
2. Set i=1
3. Create $F_i^{\bar{c}}$
4. Create $F_{ij}^{\bar{w}}$, $S_{ij}=F_{ij}^{\bar{w}} \cup F_j^{\bar{p}}$, $I_{ij}=S_{ij} \cap F_i^{\bar{c}}$ for j=1, 2, 3
5. Remove each $(f_i^{\bar{c}},*) \in F_i^{\bar{c}}$ not found in $I_{ij}$, j=1, 2, 3 more than one time.
6. Increment j and create new $I_{ij}$. Remove each $(f_i^{\bar{c}},*) \in F_i$ $\bar{c}$ not found in $I_{ik}$, k=1, 2, 3, . . . j more than j−2 times.
7. Repeat Step 6 until j>n or $F_i^{\bar{c}}$ is empty. If $F_i^{\bar{c}}$ is not empty, the pyramid i is in a failure state for some time during the simulated year; otherwise it is operable.
8. Increment i=i+1. If i>m Step 9, otherwise go to Step 4
9. Iterate through a map of values memorized during the ∩ operation and calculate cumulative customer name failures time during which one or more failures are not visible to no more than one probe server.

Figure 4A:
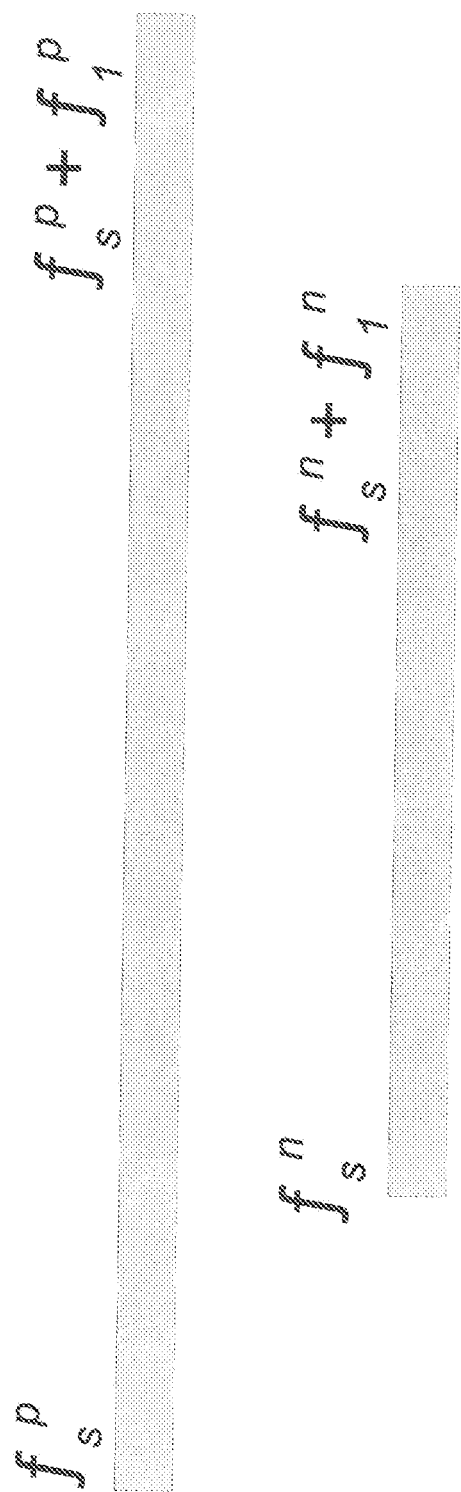
FIGS. 4A-4C illustrate timing diagrams of various service failure modes, according to still further regards.
Figure 4B:
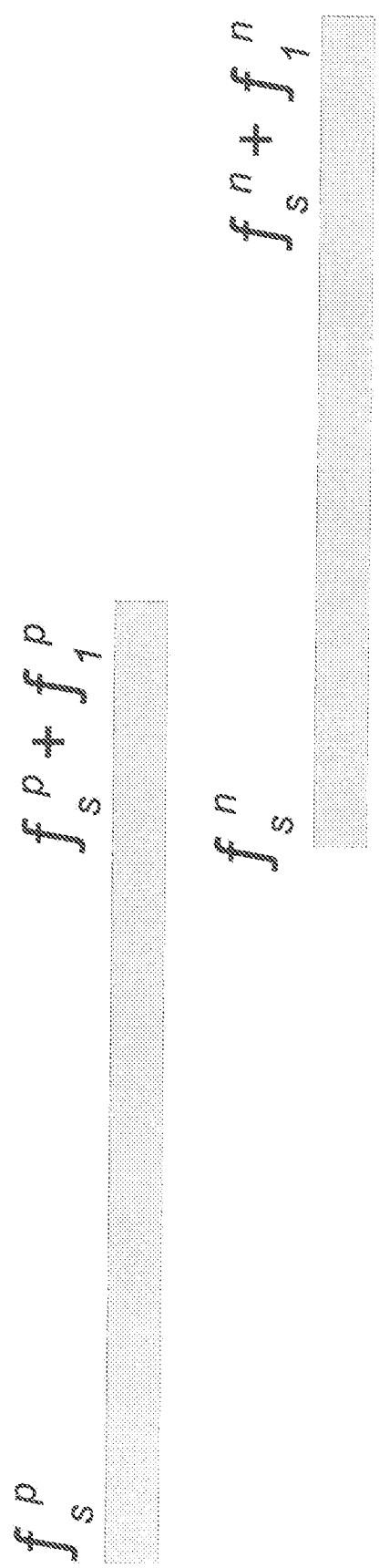
Figure 4C:
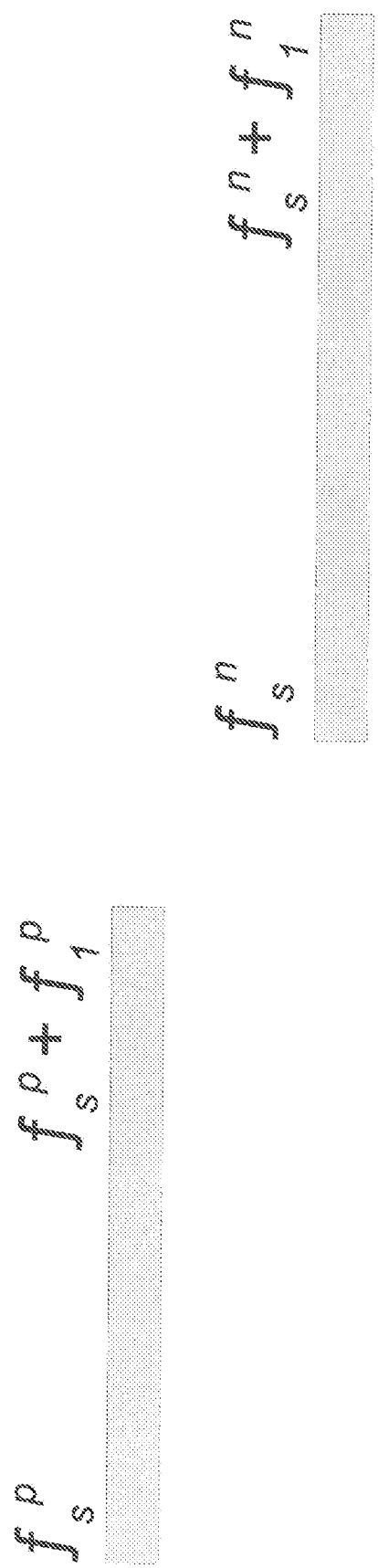

As developed above in the case of the network model 112, the simulation engine 114 can process or analyze failure events having different overlapping timings. As shown in FIG. 4A, a previous failure event can overlap the next failure completely. As shown in FIG. 4B, a previous failure event can overlap the next failure partially. Alternatively, the case where the previous and the next failure events do not overlap is shown in FIG. 4C.

Based on those failure configurations, one can compute a union value:

1. Insert all failures (represented as time intervals) from an $F_j^{\bar{p}}$ map into an $F_{ij}^{\bar{w}}$ map. If it happens that a failure from the $F_j^{\bar{p}}$ map has the same key as a failure in the $F_{ij}$ $\bar{w}$ map, replace it by the failure from the $F_j^{\bar{p}}$ map only if that failure lasts longer than its counterpart from the $F_{ij}^{\bar{w}}$ map.
2. Sort all the $F_{ij}^{\bar{w}}$ hash map keys $f_s$ in ascending order.
3. Select two first keys, marking the first as (p)revious and the second as (n)ext.
4. FIG. 4A: delete $(f_s'', f_l'')$; select the n key as the next to n. (please briefly explain: "next to n"?)
5. FIG. 4B: delete $(f_s^p, f_l^p)$, delete $(f_s'', f_l'')$ and insert $(f_s^p, f_s''+f_l''-f_s^p)$; select the n key as the next to n.
6. FIG. 4C: p=n, select the n key as the next to n.
7. If p and n exist at the same time, go to Step 4; else stop.

Considering the case of intersections, one can compute failure modes as follows.

1. Insert all failures (represented by their time intervals) from the $F_i^{\bar{c}}$ map into the $F_{ij}^{\bar{w}}$ map. If it happens that a failure from the $F_i^{\bar{c}}$ map has the same key as a failure in the $F_{ij}^{\bar{w}}$ map, replace it by the failure from the r map only if that failure lasts a shorter amount of time than its counterpart from the $F_{ij}^{\bar{w}}$ map. In order to differentiate the $F_{ij}^{\bar{w}}$ map elements coming from $F_i^{\bar{c}}$ and those not coming from $F_i^C$, enter all map elements from $F_i^{\bar{c}}$ with the negative value (i.e. as (key-value)) into the $F_{ij}$ $\bar{w}$ map.
2. Sort all the $F_{ij}^{\bar{w}}$ hash map keys $f_s$ in ascending order.
3. Select two first keys marking the first as (p)revious and the second as (n)ext.
4. FIG. 4A:
   a. if p marks a name server failure and the still visible name server rule is not applicable, memorize $(f_s^p, f_s''+f_l''-f_s^p)$;
   b. if p marks a failure from the union of the probe server and the network connection and the SLA tolerated name server failure is not applicable, memorize $(f_s'', f_l'')$;
   c. keep old p and select the new n(ext) key.
5. FIG. 4B:
   a. if p marks a name server failure and the still visible name server rule is not applicable, memorize $(f_s^p, f_l^p)$;
   b. if p marks a failure from the union of the probe server and the network connection and the SLA tolerated name server failure is not applicable, memorize $(f_s'', f_s^p+f_l^p-f_s'')$;
   c. set p=n and select the new n(ext) key.
6. FIG. 4C: p=n, select the new n(ext) key.
7. If p and n exist go to Step 4; else stop.

The simulation engine 114 can discriminate two cases: namely where a name server failure is:

a) Visible by only one probe server. The effective name server failure invisibility will be equal to the minimal invisibility time of the rest of probe servers.
b) Not visible by any of the probe servers. Now we will determine the failure invisibility time for each of the probes and select the failure invisibility which reflects the second to minimal value.

The time determined in a) or b) will be used when calculating cumulative time for all customer failures invisibility during the simulation period.

In implementations, the time intervals or periods used by the simulation engine 114 can be one year. The year is a time interval of 365*24*60=525 600 minutes. An assumption can be made that the finest human perception of the failure times is in minutes. In implementations, it can be assumed to be even more granular, i.e., one can use seconds. In this case; one year will be equal to 365*24*60*60=31 536 000 seconds. In the same fashion, failure durations can be measured in minutes and/or seconds. In implementations, it can be assumed that all the pyramid elements failures are distributed uniformly across the year and the failure interval lengths (tbfr) are uniformly distributed, too.

After appropriate intervals or periods are developed, the simulation engine 114 can apply a simulation model to the overall network 100 and its failure modes and rates. In implementations, the simulation engine used can be a Monte Carlo model or engine. In a Monte Carlo simulation, the error is roughly proportional to $1/\sqrt{n}$ for a large number n, where n is number of years simulated inside the model. Therefore, to achieve the error proportional to 0.001, the number of years simulated shall be equal to at least about 1,000,000. Thus the following:

p=w=c=1/365 Number of years simulated for n=20, 40, 60-100 000 and for n=1980, 2000-10 000; Time granularity: minute

TABLE 9

| Simu-lation | | Number of customers | | | | |
|---|---|---|---|---|---|---|
| | | 20 | 40 | 60 | . . . | 1980 | 2000 |
| Number of probes | n = 3 | 0.93 | 2.00 | 2.38 | . . . | 80.71 | 79.77 |
| | | 0.90 | 1.53 | 2.24 | . . . | 101.62 | 124.44 |
| | n = 4 | 0.00141 | 0.00293 | 0.00360 | . . . | 0.2143 | 0.2475 |
| | | 0.00203 | 0.00191 | 0.00696 | . . . | 0.2469 | 0.2485 |

This can be compared to results generated via the network model 112:

TABLE 10

| Mathematical model | | Number of customers | | | | |
|---|---|---|---|---|---|---|
| | | 20 | 40 | 60 | ... 1980 | 2000 |
| Number of probes | n = 3 | 2.58 | 5.16 | 7.73 | ... 255.12 | 257.70 |
| | n = 4 | 0.019 | 0.026 | 0.056 | ... 1.84 | 1.86 |

The simulation engine 114 can likewise take into account the occurrence of false positives, using calculations as follows, using the following annotations:

(f,t)—failure interval, presented as a (failure time stamp f, time between failure and repair t) pair, $F_j^P$, j=1, 2, . . . , n—all, within a year, time intervals, presented as (f,t), when the probe server j is out of service, $F_i^C$=1, 2, . . . , m—all, within a year, time intervals when the name server i is out of service, $F_{ij}^W$, i=1, . . . , m; j=1, 2, . . . , n—all name server i—probe server j network connection failure intervals within a year.

The following corollaries can be applied:

Corollary 1.

If at least two out of j=1, 2, . . . , n failover probes can see the name server operable at the same time within a time interval (f,t)∈$F_{ij}^W$ for some i and j, then, within this time interval, failover probes will not switch name server service to another name server.

Corollary 2.

If Corollary 1 is valid for a selected i and j=1, 2, . . . , n, then at least two of the failover probes can see the name server operable within a (simulated) year.

The two corollaries above are the basis for the following processing used to compute summary false positives time within a simulated year. The goal of this approach is to calculate cumulative false positives time for a simulated year and for a topology that has m name servers and n probe servers.

1. Set S=0.
2. Create all $F_i^C$, i=1, 2, . . . , m
3. Create all $F_j^P$, j=1, 2, . . . , n and compute $$X_i = \bigcup_{j=1}^{n} F_j^P.$$

4. Set i=1.
5. Create $F_{ij}^W$, j=1, 2, . . . , n.
6. For all (f,t)∈$F_{ij}^W$, j=1, 2, . . . , n find all intersections of nor n−1 of them and put them in some $Z_i$.
7. Compute $Z_i$=($Z_i$, \$X_i$)\$F_i^C$. For all (f,t)∈$Z_i$ add t to S.
8. If i=n stop. Otherwise, increment i and go to Step 5.
9. Repeat Steps 2.-8 for each simulated year.

The following Table 11 can be used to compare the results of simulation performed by the simulation engine 114, compared to results generated by the network model 112.

TABLE 11

| | | Number of customers | | | | |
|---|---|---|---|---|---|---|
| | | 20 | 40 | 60 | ... 1980 | 2000 |
| Number of probes | n = 3 (network model) | 0.86 | 1.69 | 2.57 | ... 84.83 | 85.67 |
| | n = 3 (simulation engine) | 0 | 0 | 0 | ... 23 | 31 |

The simulation results in Table 11 above are based on a single 1,000,000 year long simulation for each pair of (customer, probe) numbers. For other numbers of probes (4, 5, 6), simulation was not carried out for practical reasons, since simulation would require at least two days on a quad-processor machine. The results produced in any of the foregoing operations or calculations of the simulation engine 114 can be stored in a set of simulation results 126, for instance, stored in the data store 116 and/or other local or remote data store.

It may be noted that according to implementations, network architectures or topologies other than that shown in FIG. 1 can be used. For instance, as shown in FIG. 5, a set of pyramids 502 can be configured to be connected to a set of aggregators 504, which in turn are connected to a set of customer servers 506. In such a configuration, the set of pyramids 502 can be configured or defined as noted above, while the aggregators can collect domain name and other data for delivery to the set of customer servers 506. While this illustrates one additional topology that can be used, it will be appreciated that other configurations, arrangements, layouts, or topologies can be employed, consistent with the present teachings.

Figure 6:
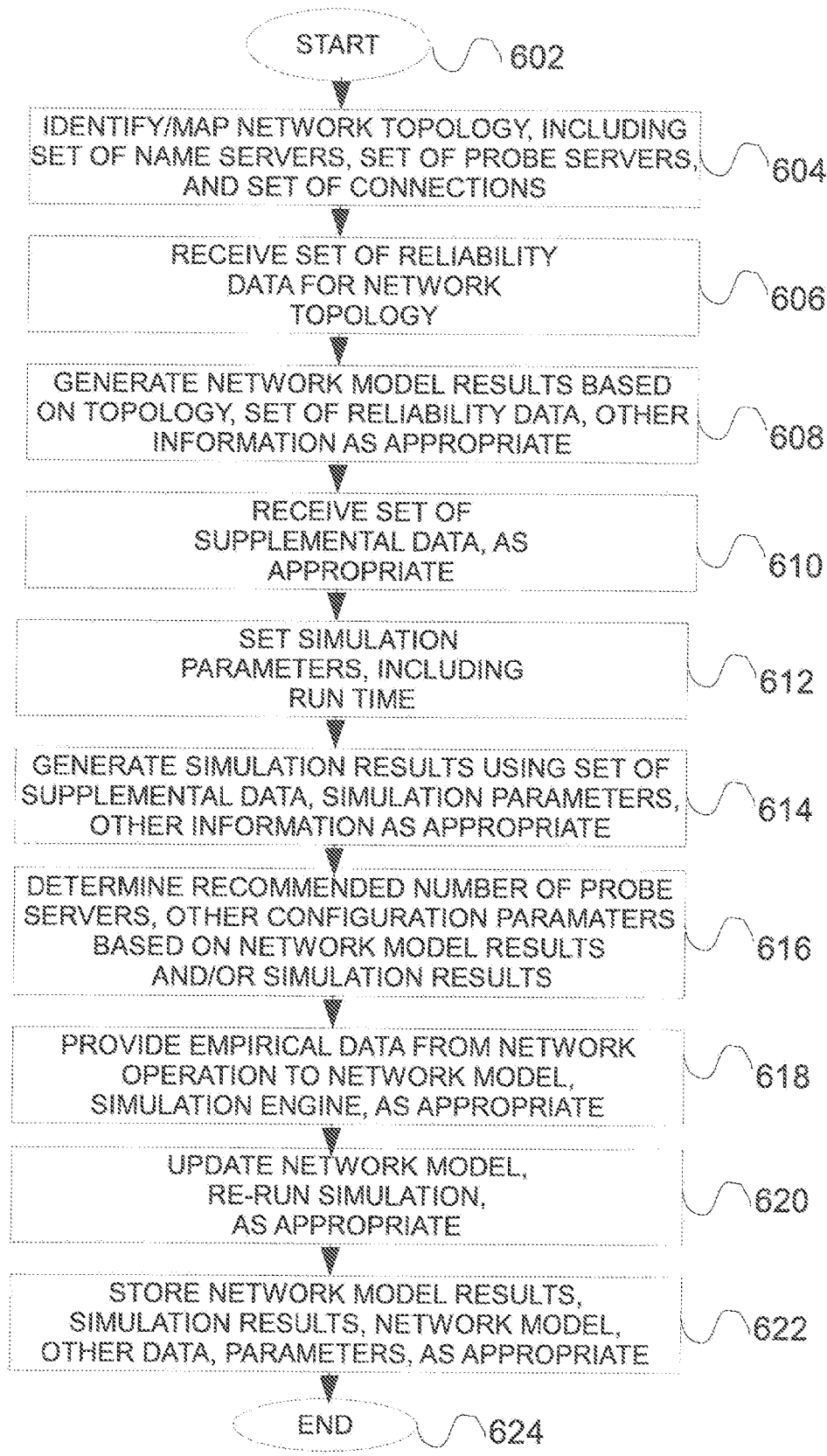
FIG. 6 illustrates a flowchart of processing that can be used in systems and methods for configuring a probe server network using a reliability model, according to various implementations.

FIG. 6 illustrates a flowchart of reliability, failover prediction, and other processing that can be performed in systems and methods for configuring a probe server network using a reliability model, according to aspects of the present disclosure. In 602, processing can begin. In 604, the process, which may be performed by management engine 110, can detect, identify, retrieve, and/or otherwise access the topology of an mDNS or other network, including the arrangement of the set of name servers 102, set of connections 104, and set of probe servers 106, and/or other nodes or resources. In aspects, the network topology can as noted include the definition of pyramids characterized by one name server at a peak of the pyramid 130, with two or more connections and/or probe servers attached to or associated with that name server. In 606, the management engine 110 and/or network model 112 can receive and/or access a set of topology maps 120 for the overall network 100, including for instance expected failure rates for any of the servers or other components or connections used in the network. In 608, the network model 112 can generate a set of network model results 122 based on the set of topology maps 120 and other information, as appropriate.

In 610, the management engine 110 can receive a set of supplemental data 124, which can be or include actual or empirical data captured during the operation of the overall network 100, including data regarding the reliability and performance of the set of name servers 102, set of connections 104, and/or set of probe servers 106, In 612, the simulation engine 114 can receive and/or set various parameters for the execution of one or more simulations of the overall network 100, including the run time of the simulation. In 614, the simulation engine 114 can generate a set of simulation results 126, using the set of supplemental data 124, any selected simulation parameters, and/or other information, as appropriate.

In 616, the network model 112, simulation engine 114, and/or management engine 110 can determine and/or recommend a number of probe servers and/or other network configuration parameters based on the set of network model results 122 and/or set of simulation results 126. In implementations, the identified number of probe servers and/or other configuration parameters can represent or reflect a minimum number of servers, nodes, and/or other elements. In implementations, the identified number of probe servers and/or other configuration parameters can represent or reflect a minimum number of servers, nodes, and/or other elements. In implementations, the identified number of probe servers and/or other configuration parameters can represent or reflect a balanced and/or optimized minimum number of servers, nodes, and/or other elements, all while taking the reliability, service level, and other variables into account. In 618, further empirical, captured, and/or observed data can be provided to the management engine 110, network model 112, and/or simulation engine 114, as appropriate. Empirical or operational data can be imported, for instance, after a predetermined period of operation of the set of name servers 102, set of connections 104, set of probe servers 106, and/or other elements, or the network as a whole.

In 620, the network model 112 can be updated or re-executed, and/or the simulation engine 114 can be updated or re-executed, based on any additional information feeds, or otherwise. In 622, the set of network model results 122, the set of simulation results 126, the network model 112, the simulation engine 114, and/or other models, engines, modules, topologies or network maps, and/or other components, parameters, or data described herein can be stored, for instance to data store 116, or other local or remote data storage resources. In 624, processing can repeat, return to a prior processing point, jump to a further processing point, or end.

Figure 7:
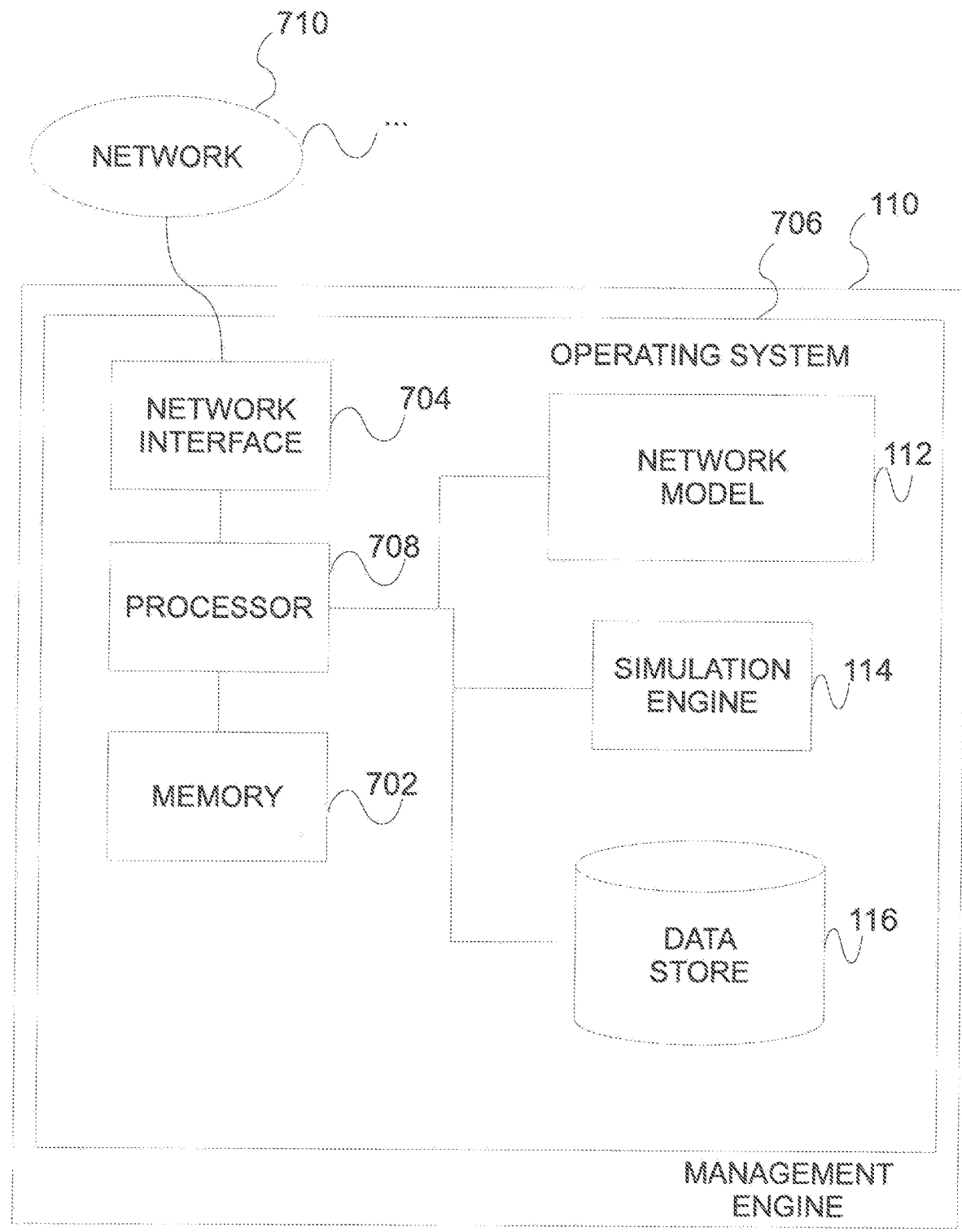
FIG. 7 illustrates exemplary hardware, software, and other resources that can be used in supporting hardware for systems and methods for configuring a probe server network using a reliability model, according to various implementations.

FIG. 7 illustrates various hardware, software, and other resources that can be used in implementations of configuring probe server network using reliability model, according to implementations. In implementations as shown, the management engine 110 can comprise a platform including a processor 708 communicating with a memory 702, such as electronic random access memory, operating under control of or in conjunction with an operating system 706. The processor 708 in implementations can be incorporated in one or more servers, laptop computers, desktop computers, clusters, and/or other computers, computing systems, or hardware resources, and/or can be implemented using cloud-based resources. The operating system 706 can be, for example, a distribution of the Linux™ operating system, the Unix™ operating system, or other open-source or proprietary operating system or platform. The processor 708 can communicate with the data store 116, such as a database stored on a local hard drive or drive array, to access or store a set of topology maps 120, the set of network model results 120, the set of supplemental data 124, the set of simulation results 126, and/or subsets of selections thereof, as well as other content, media, or other data.

The processor 708 can further communicate with a network interface 704, such as an Ethernet or other wired, optical, and/or wireless data connection, which in turn communicates with the one or more networks 710, such as the Internet or other public or private networks. The processor 708 can, in general, be programmed or configured to execute instruction or other control logic and to control various processing operations, including to execute the modeling, simulations, and/or other operations described herein. In aspects, the set of name servers 102, the set of probe servers 106, and other nodes or elements can be or include resources similar to those of the management engine 110, and/or can include additional or different hardware, software, and/or other resources. Other configurations of the overall network 100 including the set of name servers 102, set of connections 104, set of probe servers 106, additional network connections, and other hardware, software, and service resources are possible.

The foregoing description is illustrative, and variations in configuration and implementation may occur to persons skilled in the art. For example, while implementations have been described in which one set of probe servers 106 monitors one set of name servers 102, in implementations, the set of probe servers 106 can monitor and manage more than one separate set of name servers, such as those dedicated to or operated by multiple Web domain operators or other entities. Other resources described as singular or integrated can in implementations be plural or distributed, and resources described as multiple or distributed can in implementations be combined. The scope of the present teachings is accordingly intended to be limited only by the following claims.

What is claimed is:

1. A method of managing a network, comprising:
   accessing a network topology map associated with the network, wherein the network topology map comprises a plurality of probe servers, a plurality of endpoint machines, and a plurality of connections between the plurality of probe servers and the plurality of endpoint machines;
   computing, by a computer processor, an intersecting time interval comprising an overlap of:
   (i) a combined time interval that includes a first time interval of probe server failures associated with a plurality of probe servers, and a second time interval of connection failures associated with the plurality of connections, and
   (ii) a third time interval of endpoint machine failures associated with the plurality of endpoint machines;
   generating, based on both the network topology map and the intersecting time interval, a first set of network model data;
   identifying, based on the first set of network model data, a minimum number of probe servers required to monitor the plurality of endpoint machines when operating at a target service level; and
   generating, based on including the minimum number of probe servers in the network topology map and the intersecting time interval, a second set of network model data.

2. The method of claim 1, wherein the network comprises a managed domain name system network.

3. The method of claim 1, wherein the target service level comprises a minimum time between network failures.

4. The method of claim 1, further comprising identifying, based on the first set of network model data, a maximum number of probe servers required to support the target service level.

5. The method of claim 1, wherein the minimum number of probe servers comprises at least three probe servers.

6. The method of claim 1, wherein the first set of network model data indicates that an endpoint machine is out of service when at least two probe servers independently detect that the endpoint machine is out of service.

7. The method of claim 1, wherein the first set of network model data is based on a set of reliability data that comprises at least one of a predicted failure rate for the plurality of probe servers, a predicted failure rate for the plurality of endpoint machines, or a predicted failure rate for the plurality of connections.

8. The method of claim 1, further comprising executing a simulation engine on the network topology map to simulate how the network operates over a specified amount of time.

9. The method of claim 8, wherein the simulation engine comprises a Monte Carlo engine.

10. A system, comprising:
a first interface to a plurality of endpoint machines;
a second interface to a plurality of probe servers, the plurality of probe servers being connected to the plurality of endpoint machines via a plurality of connections; and
a processor that, when executing instructions, communicates with the plurality of endpoint machines via the first interface and the plurality of probe servers via the second interface and performs the steps of:
accessing a network topology map associated with a network, wherein the network topology map comprises the plurality of probe servers, the plurality of endpoint machines, and the plurality of connections,
computing an intersecting time interval comprising an overlap of:
(i) a combined time interval that includes a first time interval of probe server failures associated with a plurality of probe servers, and a second time interval of connection failures associated with the plurality of connections, and
(ii) a third time interval of endpoint machine failures associated with the plurality of endpoint machines;
generating, based on both the network topology map and the intersecting time interval, a first set of network model data;
identifying, based on the first set of network model data, a minimum number of probe servers required to monitor the plurality of endpoint machines when operating at a target service level, and
generating, based on including the minimum number of probe servers in the network topology map and the intersecting time interval, a second set of network model data.

11. One or more non-transitory computer readable media storing instructions that, when executed by one or more processors, cause the one or more processors to manage a network, by performing the steps of:
accessing a network topology map associated with the network, wherein the network topology map comprises a plurality of probe servers, a plurality of endpoint machines, and a plurality of connections between the plurality of probe servers and the plurality of endpoint machines;
computing, by a computer processor, intersecting time interval comprising an overlap of:
(i) a combined time interval that includes a first time interval of probe server failures associated with a plurality of probe servers, and a second time interval of connection failures associated with the plurality of connections, and
(ii) a third time interval of endpoint machine failures associated with the plurality of endpoint machines;
generating, based on both the network topology map and the intersecting time interval, a first set of network model data;
identifying, based on the first set of network model data, a minimum number of probe servers required to monitor the plurality of endpoint machines when operating at a target service level; and
generating, based on including the minimum number of probe servers in the network topology map and the intersecting time interval, a second set of network model data.

12. The one or more non-transitory computer readable media of claim 11, wherein the network comprises a managed domain name system network.

13. The one or more non-transitory computer readable media of claim 11, wherein the target service level comprises a minimum time between network failures.

14. The one or more non-transitory computer readable media of claim 11, further comprising identifying, based on the first set of network model data, a maximum number of probe servers required to support the target service level.

15. The one or more non-transitory computer readable media of claim 11, wherein the minimum number of probe servers comprises at least three probe servers.

16. The one or more non-transitory computer readable media of claim 11, wherein the first set of network model data indicates that an endpoint machine is out of service when at least two probe servers independently detect that the endpoint machine is out of service.

17. The one or more non-transitory computer readable media of claim 11, wherein the first set of network model data is based on a set of reliability data that comprises at least one of a predicted failure rate for the plurality of probe servers, a predicted failure rate for the plurality of endpoint machines, or a predicted failure rate for the plurality of connections.

18. The one or more non-transitory computer readable media of claim 11, further comprising executing a simulation engine one the network topology map to simulate how the network operates over a specified amount of time.

19. The one or more non-transitory computer readable media of claim 18, wherein the simulation engine comprises a Monte Carlo engine.

* * * * *